United States Patent [19]

Lalanne

[11] 4,357,046
[45] Nov. 2, 1982

[54] RETRACTABLE VEHICLE STORAGE SHELF ARRANGEMENT

[75] Inventor: Andre P. Lalanne, Mesnil-St. Denis, France

[73] Assignees: Societe Anonyme Automobiles Citroen; Automobiles Peugeot, both of Paris, France

[21] Appl. No.: 199,700

[22] Filed: Oct. 23, 1980

[51] Int. Cl.³ .................................................. B60R 5/04
[52] U.S. Cl. ................................ 296/37.16; 224/42.42; 296/106
[58] Field of Search ................... 296/37.1, 37.16, 106, 296/24 R; 224/42.42 R

[56]          References Cited
       U.S. PATENT DOCUMENTS

| | | | |
|---|---|---|---|
| 3,910,625 | 10/1975 | Menard | 296/37.16 |
| 4,148,516 | 4/1979 | Gotomyo | 296/37.1 |
| 4,222,600 | 9/1980 | Cripps | 296/37.1 |
| 4,277,097 | 7/1981 | Lalanne | 296/37.16 |

FOREIGN PATENT DOCUMENTS 2123462  1/1972  Fed. Rep. of Germany ... 296/37.16

*Primary Examiner*—Joseph F. Peters, Jr.
*Assistant Examiner*—John A. Carroll
*Attorney, Agent, or Firm*—Brisebois & Kruger

[57]                ABSTRACT

The back of a retractable shelf is pivotally connected to a rear door or trunk lid, for example, of a hatch-back automobile. A flexible element is connected to the front of the shelf, extends through a bearing on the rear door, and is anchored to the vehicle to support the shelf in a horizontal position when the rear door is closed. The anchor point, and bearing location on the rear door are such that the bearing moves away from the anchor point as the door is opened, thus pulling the flexible element through the bearing to retract the shelf against the door, when the door is fully open.

7 Claims, 4 Drawing Figures

RETRACTABLE VEHICLE STORAGE SHELF ARRANGEMENT

BACKGROUND OF THE INVENTION

The invention relates to a retracting device for retracting a shelf particularly the rear shelf or deck of a vehicle connected to a movable raisable panel such as a tailgate or hatchback door, the retraction insuring free access to the upper region of the luggage compartment.

It is known to use certain connections between the shelf and the panel or door so that the clearance in the upper region of the luggage compartment improves access from outside the vehicle for loading and unloading, possibly increases the usable volume of the luggage compartment or trunk, and possibly allows access to the passenger compartment of the vehicle.

Using complex kinematic mechanisms with pivoted joints and cumbersome or fragile returns, the prior art devices were only partly satisfactory. Certain problems, such as in particular, that of internal displacement (limited by the interior structures of the vehicle) are resolved only by shifting or slanting a section of the shelf to provide clearance, but significantly reduce the access opening of the luggage compartment, or require the use of detachable side members whose manipulation is impractical and time consuming.

SUMMARY OF THE INVENTION

This invention solves these problems, and offers various other advantages such as a retractor fixed to the shelf, a unique geometry of displacement characterized by the direct pivoting of the rear edge of the shelf on the door or mobile panel, a region of the shelf spaced from the rear edge being attached to a fixed anchor point of the structure supporting the panel by means of a flexible element passing through an intermediate bearing fixed to the panel, a bearing through which the flexible element is required to slide during all or part of the displacement of the movable panel.

According to another characteristic of the invention, an abutment element is disposed on the flexible element, between the end fixed to the structure and the intermediate bearing, so that in the lowered position of the door or mobile panel, and on engagement with the intermediate bearing it maintains tension in the segment of the flexible element between the intermediate bearing and the point of fastening on the bracket, and provides slack in the segment of the flexible element between the intermediate bearing and the anchor point on the structure.

The invention will be better understood and other characteristics will appear on reading the following description and on consideration of the drawings showing the different phases of the kinematics of retracting the shelf in the course of raising the mobile panel, in this case the rear door or tailgate of a vehicle.

Figure 1:
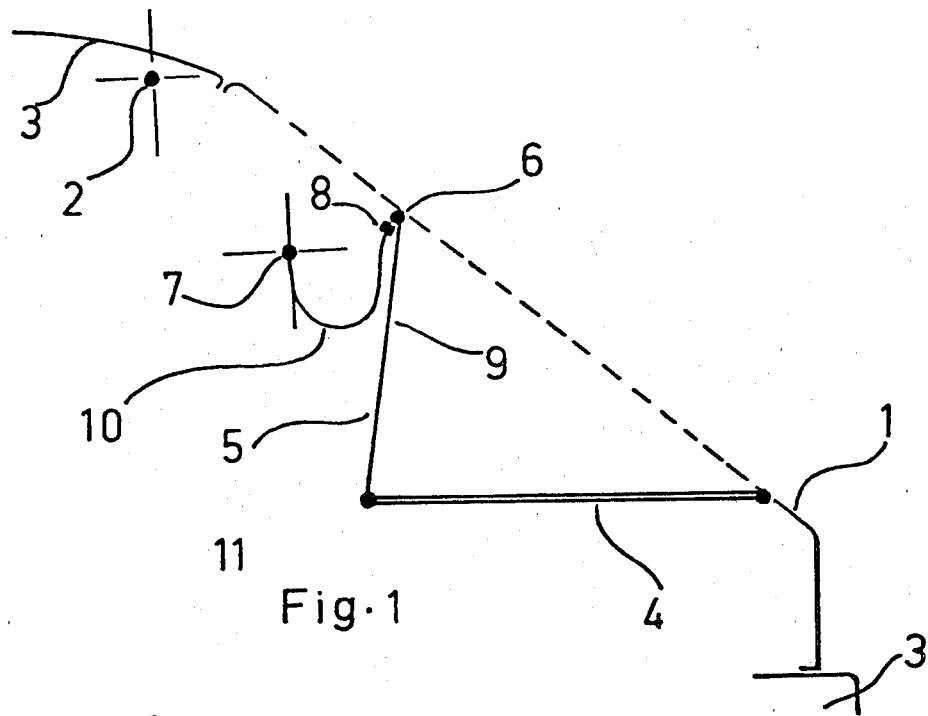
FIG. 1 is a schematic view in elevation showing the position of the mechanism of the invention in a "closed" position of the rear door or panel of the vehicle.

The device of the invention is composed of the following elements:

(a) A tailgate or rear door panel 1 pivoting around an upper hinge 2 fixed to a structure 3, which is in this instance a vehicle body.

(b) A panel or shelf 4 connected at its rear edge to the tailgate by a hinge for pivotal movement about the horizontal axis of the hinge.

(c) A flexible element 5 traversing and guided by an intermediate slide bearing 6 fixed to the tailgate 1, one end of element 5 being fastened to an anchor point 7 of structure 3 of the vehicle, the opposite end being coupled to the front edge of shelf 4.

(d) A stop 8 disposed on and fixed to the flexible element 5, between the intermediate bearing 6, and the anchor point 7 of the structure 3, so that in the closed door position (FIG. 1) the stop 8 shifts to engage bearing 6 to support the front edge of shelf 4 and maintains equilibrium tension in segment 9 between bearing 6 and connection 11 to shelf 4, while the remaining segment of flexible element 10 between stop 8 now at bearing 6 and the anchor point 7 is relaxed or slack, this arrangement having the effect of creating excess length in segment 10 with respect to the distance between anchor point 7 and bearing 6, this excess length resulting in slack in a portion of segment 10, when rear door 1 is closed.

Figure 2:
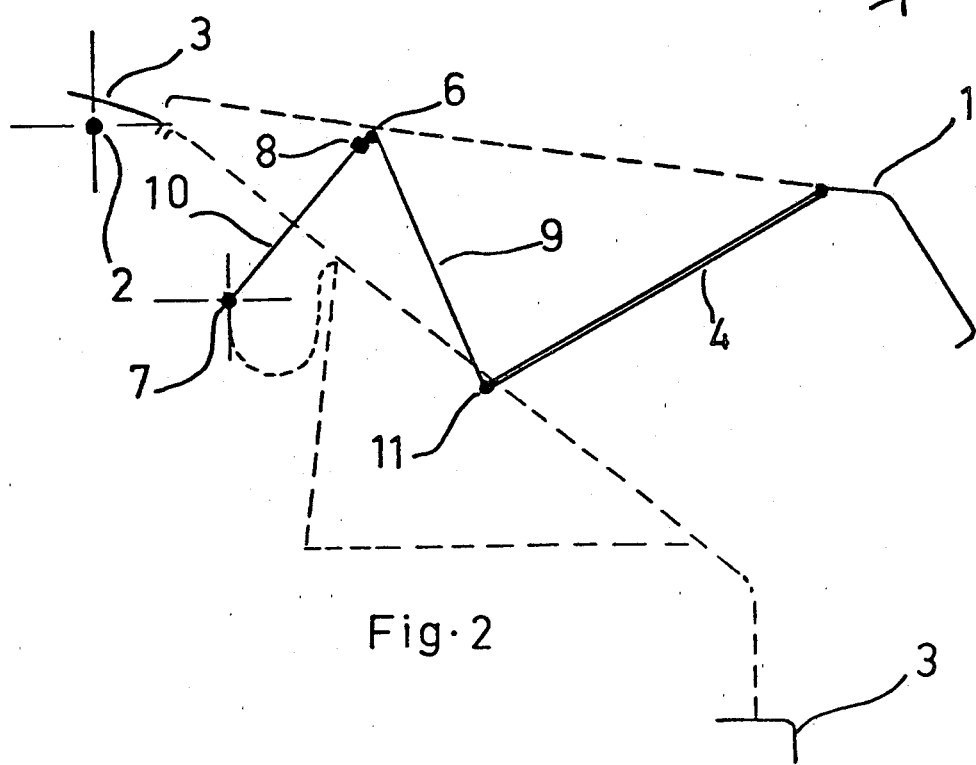
FIG. 2 is a schematic view in elevation showing the mechanism of FIG. 1 when the rear door is in a partly open intermediate position.

It will be seen from FIG. 2 that lifting mobile panel or door 1 will cause, in a first displacement phase in which the door is partly open, deployment of segment 10 as a result of an increase in the distance between the anchor point 7 and the bearing 6, this increase causing an "end of course" tension in segment 10 as shown at FIG. 2. At this intermediate position, both segments 9 and 10 of the flexible element 5 are tensioned and shelf 4 is advantageously spaced from the car interior structure. Continuation of the raising of panel or door 1 will lead to a further increase in the distance between the anchor point 7 and the bearing 6, causing the sliding of flexible element 5 through bearing 6 and the total retraction of shelf 4 flush against the inside of panel or door 1 (FIG. 3).

Figure 3:
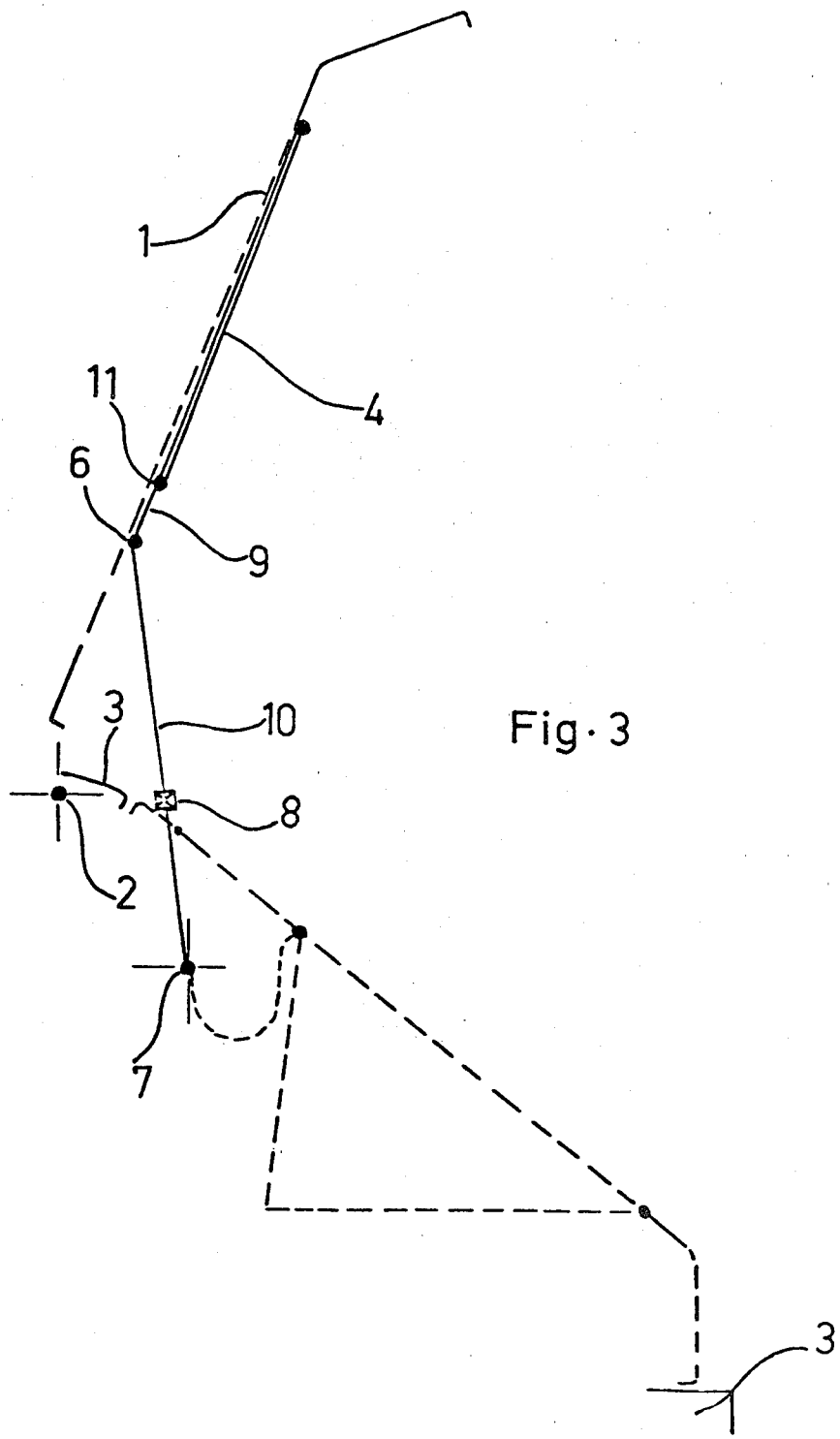
FIG. 3 is a schematic view in elevation showing the mechanisms with the rear door fully open.
Figure 4:
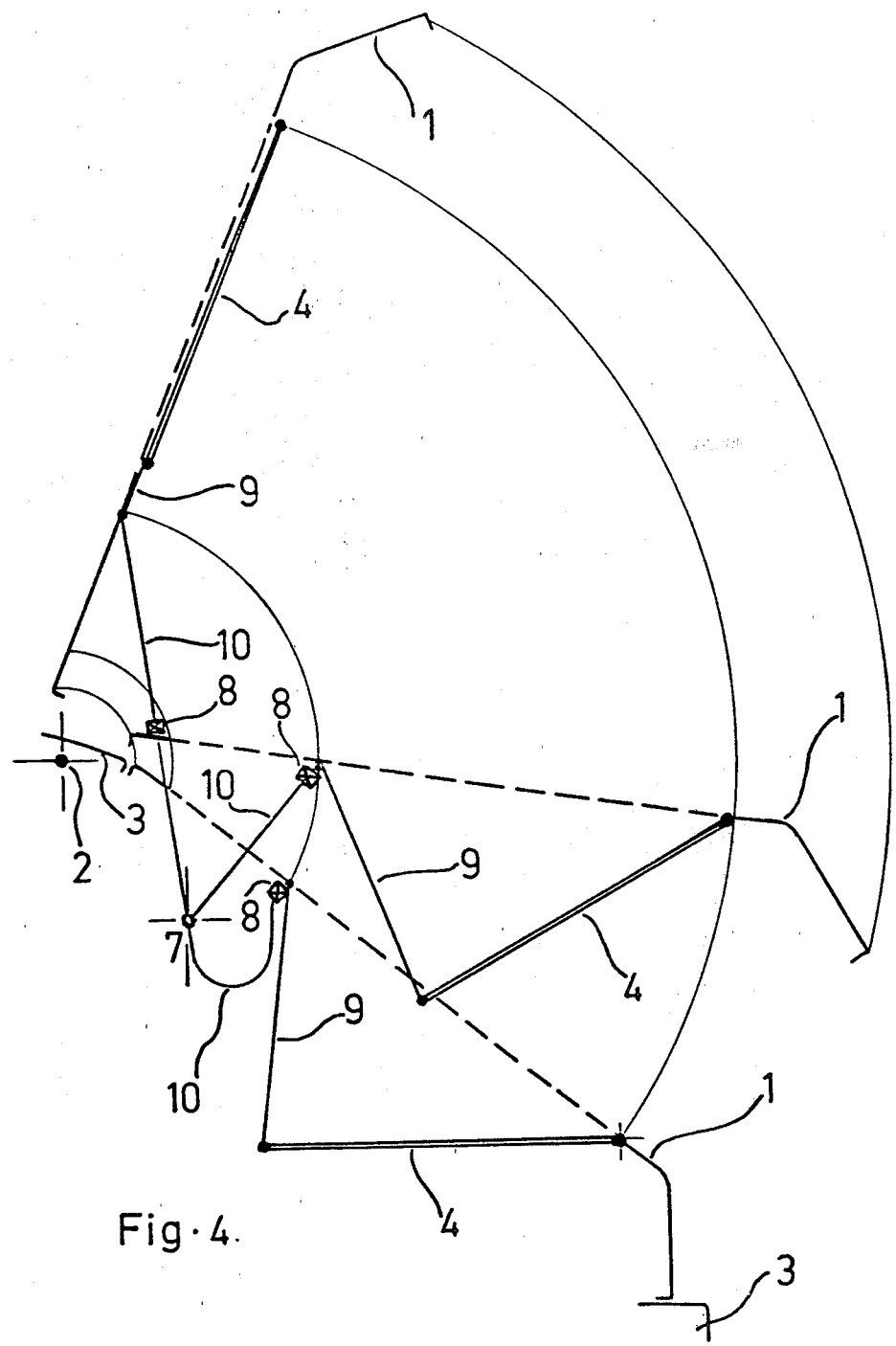
FIG. 4 is a combination of FIGS. 1–3 showing the paths of movement of and the positions of the mechanism parts at the several positions of the door.

At the stage shown at FIG. 3, the total retraction of shelf 4 provides complete accessibility to the trunk or luggage compartment, both from inside and outside the vehicle, under conditions of optimum clearance. The fact that the shelf is spaced from the interior of the vehicle eliminates displacement depending on the geometry of the vehicle interior and permits the use of a shelf with a large surface.

Flexible element 5 can take the form of a thin narrow metal band or a narrow strip of fiberglass reinforced plastic which is flexible but essentially inelastic longitudinally. Bearing 6 can be a shallow U-shaped metal strap or a block of plastic material having a shallow U-shaped recess through which the flexible element is extended and which is secured to the inside of door 1, to thus provide a rectangular slot through which flexible element 5, when it is a band or strip, can slide. Stop 8 can be a small plastic block moulded or pinned to the flexible element 5 and of a size not to pass through the slot in bearing 6. Anchor 7 can be a pin or rod and the end of segment 10 can have a loop through which the pin extends so the end can swivel on the pin during movement through the FIG. 1–3 positions. A similar connection can be provided between the front of the shelf and the end of segment 9. The hinge connection between the rear of the shelf 4 and the inside of door 1 can include a slightly loaded elastic bushing which permits the shelf to pivot under its own weight but prevents rattles when the vehicle is in motion.

The shelf 4 can have a length almost as great as the width of the rear door opening of the vehicle with some slight side clearance between the ends of the shelf and the sides of the door opening. The shelf can have a depth from front to back which is almost as long as the length of the rear door 1. Articles stored in the space beneath the shelf 4 are hidden from view of a potential thief, and the shelf provides an attractive appearance even if articles are strewn in the storage space beneath the shelf.

It will of course be evident that the invention is not limited to the embodiment described, but is intended to cover possible variations, for example, the mechanism can be, in operation, either singly in the central or side region of the shelf, or in multiple form, as at both sides.

As a variation, shelf 4 could be selectively fastenable to the door or panel 1 in the retracted position by a quick acting fastener such as a snap or selectively operable latch, which could be engaged manually to hold the shelf retracted independent of the position of the door or panel, the previously described embodiment being particularly well adapted to such an arrangement.

The shelf can be made partly or wholly from a transparent, perforated, or latticed material to permit rear vision through the rear window usually provided in door 1 when the shelf is latched in the retracted position.

This application is related to application in France No. 79/26 433, filed Oct. 24, 1979, and the disclosure thereof is incorporated herein by reference.

It will appreciated that the flexible element (5) has a total length which is at least as great as the distance between anchor posint (7) and bearing (6) added to the distance between bearing (6) and the point of connector of the flexible element to the front end of shelf (4), when the rear door (1) is closed. It is preferred however that the length of the flexible element be greater, in which instance the stop (8) maintains shelf (4) in the desired generally horizontal position shown at FIG. 1 when the rear door (1) is closed. Where the hinged point of the trunk is close to the anchor point (7) a flexible element (5) of a length equal to the distance between anchor point (7) and bearing (6) and the connection at the front of the shelf, is all that is required.

What is claimed is:

1. A retractable storage shelf assembly, particularly a rear deck of a vehicle connected to a movable panel or door raisable with respect to the vehicle comprising, a shelf, hinge means connecting a rear portion of the shelf to the door for pivotal movement with respect to the door between a first position in which the shelf is generally horizontal, and a second position in which the shelf is substantially retracted toward the door, the door being movable between a lowered position and an elevated position, and retracting means for retracting said shelf from said first position to said second position in response to movement of the door from the lowered to elevated position, said retracting means comprising, a flexible element having one of its ends connected to said shelf at a location spaced from the rear portion of the shelf, and its other end connected to an anchor point of the vehicle, bearing means connected to said door at a location above and remote from said hinge means and across which said flexible element extends for guiding a length of the element between its ends along a predetermined path with respect to the door, said bearing means being movable with the door away from said anchor point during movement of the door toward its elevated position to increase the length of flexible element between the bearing means and the anchor point and to decrease the length of the flexible element between the bearing means and the shelf, so that the shelf is retracted toward the door as the door is moved to its elevated position.

2. A retractable shelf according to claim 1, and further comprising abutment means fixed to said flexible element at a predetermined position thereon between said anchor point and said bearing means for engaging said bearing means to limit the length of the flexible element between the bearing means and the shelf to a length required to support the shelf in said first position, when the door is closed.

3. A retractable shelf according to claim 2, wherein said abutment means is positioned on the flexible element at a location to provide slack therein when the door is lowered, between the abutment means and the anchor point, while permitting the shelf to tension the portion of the flexible element between the bearing and the shelf.

4. A retractable shelf according to claim 1, comprising two of said flexible elements one at each side of the shelf.

5. A retractable storage shelf according to any one of the preceding claims, further comprising means for selectively connecting said shelf to said door in said second position, against movement thereof to said first position.

6. A retractable shelf according to claims 1, 2, 3 or 4 wherein said shelf comprises a shelf at least partly of transparent material to avoid obscuring vision through a rear window of the door when said shelf is in said first position.

7. A shelf according to any one of claims 1, 2, 3 or 4 wherein said shelf comprises a latticed shelf.

* * * * *

UNITED STATES PATENT AND TRADEMARK OFFICE
CERTIFICATE OF CORRECTION

PATENT NO. : 4,357,046

DATED : November 2, 1982

INVENTOR(S) : Andre Pierre Lalanne

It is certified that error appears in the above-identified patent and that said Letters Patent is hereby corrected as shown below:

On the title page, Insert

-- (30) Foreign Application Priority Data
October 24, 1979 France 79/26433 --

Signed and Sealed this

Fifteenth Day of February 1983

[SEAL]

Attest:

GERALD J. MOSSINGHOFF

Attesting Officer

Commissioner of Patents and Trademarks